(12) United States Patent
Pan et al.

(10) Patent No.: US 9,033,518 B2
(45) Date of Patent: May 19, 2015

(54) ILLUMINATION SYSTEM COMPRISING A ROTATION WHEEL WITH TRANSMISSIVE AND REFLECTIVE REGIONS AND A PHOSPHOR USED FOR CONVERTING A LIGHT BEAM OF A FIRST COLOR FROM THE REFLECTIVE OR TRANSMISSIVE REGION TO A SECOND COLOR AND PROJECTION APPARATUS

(75) Inventors: Haw-Woei Pan, Hsinchu (TW); Chao-Shun Chen, Hsinchu (TW); Hung-Chih Chou, Hsinchu (TW); Hsin-Hung Lin, Hsinchu (TW); Yu-Yun Chang, Hsinchu (TW)

(73) Assignee: Young Optics Inc., Hsinchu (TW)

( * ) Notice: Subject to any disclaimer, the term of this patent is extended or adjusted under 35 U.S.C. 154(b) by 883 days.

(21) Appl. No.: 13/234,122

(22) Filed: Sep. 15, 2011

(65) Prior Publication Data

US 2013/0070205 A1    Mar. 21, 2013

(51) Int. Cl.
*G03B 21/14* (2006.01)
*F21V 9/16* (2006.01)
*F21V 7/00* (2006.01)
*G03B 21/20* (2006.01)
*H04N 9/31* (2006.01)
*G03B 33/08* (2006.01)

(52) U.S. Cl.
CPC ............ *G03B 21/204* (2013.01); *H04N 9/3158* (2013.01); *G03B 33/08* (2013.01); *H04N 9/3117* (2013.01); *H04N 9/3164* (2013.01)

(58) Field of Classification Search
CPC ............ F21V 9/00; F21V 9/08; F21V 14/04; F21V 3/0481; F21V 9/10; F21V 7/00; F21V 7/0083; F21V 7/0025; G02B 26/007; G02B 26/008; G02B 26/00; G03B 21/204; G03B 21/00; G03B 21/206; G03B 21/2066; G03B 33/08; H04N 9/3117; H04N 9/3164; H04N 9/3158
USPC ................. 353/98, 31, 30, 82, 84, 99, 122; 348/744, 759; 362/84, 296.01, 297, 362/300, 307, 341, 545, 247; 359/197.1, 359/212.1, 212.2; 313/113, 498; 349/61, 71
See application file for complete search history.

(56) References Cited

U.S. PATENT DOCUMENTS 4,795,256 A * 1/1989 Krause et al. ................. 356/320
8,272,745 B2 * 9/2012 Shibasaki ....................... 353/31

(Continued)

FOREIGN PATENT DOCUMENTS

CN          101498415          8/2009

*Primary Examiner* — Que T Le
*Assistant Examiner* — Jennifer Bennett
(74) *Attorney, Agent, or Firm* — Jianq Chyun IP Office

(57) ABSTRACT

An illumination system includes a first light source, a first rotation wheel, a first phosphor element, and a light combining element. The first light source is capable of emitting a first color beam. The first rotation wheel is disposed on a transmission path of the first color beam and includes a first transmissive region and a first reflective region. The first transmissive region is capable of allowing the first color beam to pass through so as to form a first color transmissive beam. The first reflective region is capable of reflecting the first color beam to form a first color reflective beam. One of the first color transmissive and reflective beams excites the first phosphor element to form a second color beam. The light combining element combines the second color beam and a beam originating from the other one of the first color transmissive and reflective beams.

32 Claims, 7 Drawing Sheets

(56) References Cited

U.S. PATENT DOCUMENTS

2010/0328625 A1* 12/2010 Miyazaki et al. ............... 353/85
2010/0328632 A1   12/2010 Kurosaki et al.
2011/0234923 A1*  9/2011 Yamagishi et al. ........... 348/757
2012/0243205 A1*  9/2012 Lin ................................. 362/84

* cited by examiner

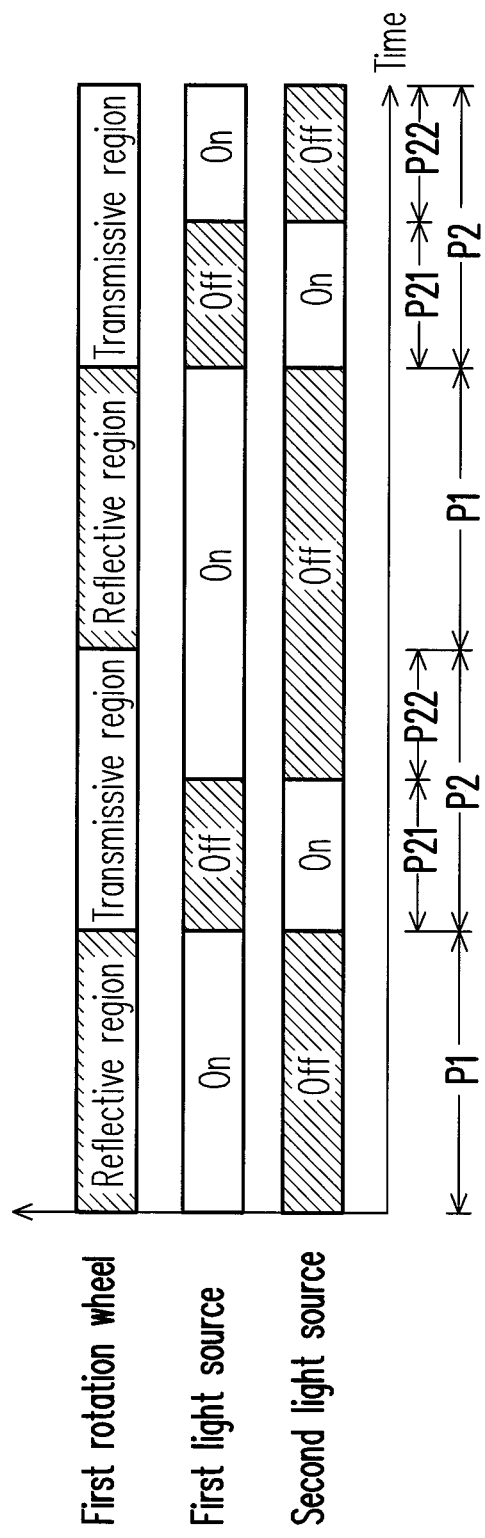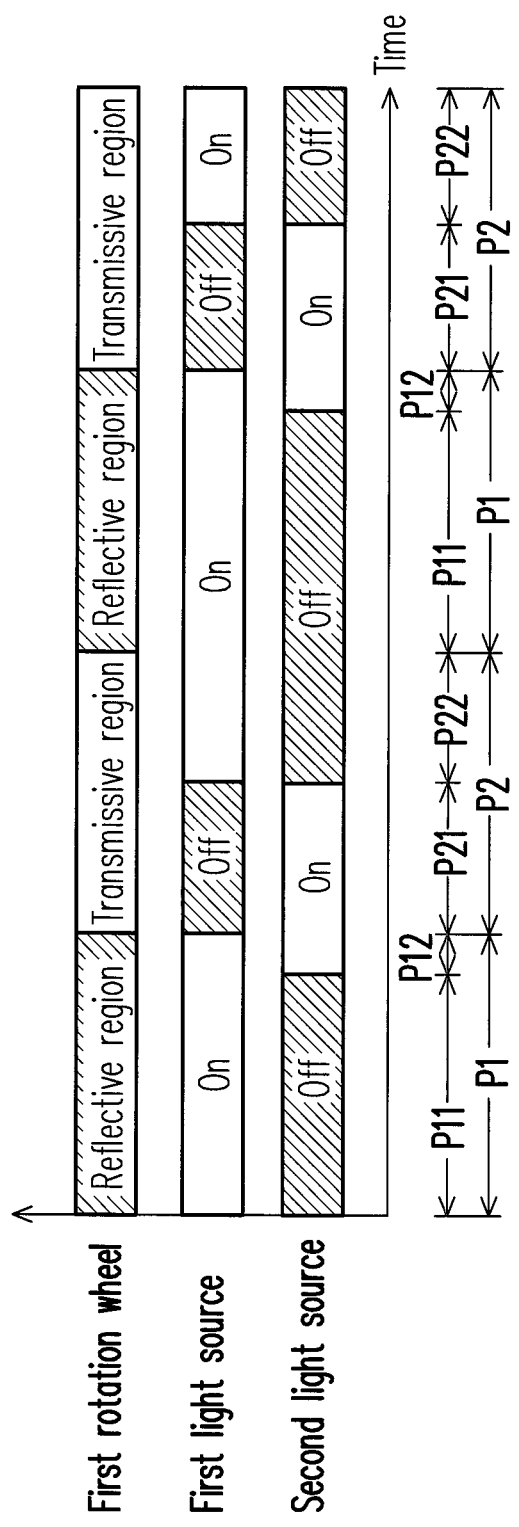

ILLUMINATION SYSTEM COMPRISING A ROTATION WHEEL WITH TRANSMISSIVE AND REFLECTIVE REGIONS AND A PHOSPHOR USED FOR CONVERTING A LIGHT BEAM OF A FIRST COLOR FROM THE REFLECTIVE OR TRANSMISSIVE REGION TO A SECOND COLOR AND PROJECTION APPARATUS

BACKGROUND OF THE INVENTION

1. Field of the Invention

The invention generally relates to an optical system and an optical apparatus and, in particular, to an illumination system and a projection apparatus.

2. Description of Related Art

A conventional projection apparatus with high brightness generally adopts ultra high pressure (UHP) lamp as light source. However, in the trend of green energy, many countries are gradually inhibiting the use of lamp with mercury. As a result, finding a substitutive environmentally friendly light source for the projection apparatus becomes a main issue in the field of the projection apparatus.

Light-emitting diodes (LEDs) have been broadly used in various fields of light sources. LEDs have a long lifespan and high color saturation and are environmentally friendly due to power saving and no mercury contained. However, the brightness of current LEDs has not achieved the level of brightness of UHP lamps, so that the projection apparatuses with LEDs can still not completely replace the projection apparatuses with UHP lamps.

A conventional technique uses a light with short wavelength to excite a phosphor to achieve higher brightness. For example, U.S. patent application publication No. 20100328632 discloses a light source system including a plurality of blue light sources, reflective mirrors, a color wheel, light guide element. The color wheel includes a green phosphor layer and a red phosphor layer. PRC patent publication No. 101498415 discloses an illumination light source including a light source, a beam splitting filter, an excited material layer, a first reflective surface, a second reflective surface, and a rotation shaft.

SUMMARY OF THE INVENTION

Accordingly, the invention is directed to an illumination system capable of providing high brightness.

The invention is directed to a projection apparatus capable of providing images with high brightness.

Other advantages of the invention can be further illustrated by the technical features broadly embodied and described as follows.

In order to achieve one or a part of or all of the above advantages or other advantages, an embodiment of the invention provides an illumination system including a first light source, a first rotation wheel, a first phosphor element, and a light combining element. The first light source is capable of emitting a first color beam. The first rotation wheel is disposed on a transmission path of the first color beam and includes a first transmissive region and a first reflective region. The first transmissive region is capable of allowing the first color beam to pass through so as to form a first color transmissive beam. The first reflective region is capable of reflecting the first color beam to form a first color reflective beam. The first transmissive region and the first reflective region alternately pass through the transmission path of the first color beam when the first rotation wheel rotates. One of the first color transmissive beam and the first color reflective beam excites the first phosphor element to form a second color beam, and a color of the first color beam is different from a color of the second color beam. The light combining element combines the second color beam and a beam originating from the other one of the first color transmissive beam and the first color reflective beam.

Another embodiment of the invention provides a projection apparatus including the above-mentioned illumination system, a light valve, and a projection lens. The light combining element combines at least the second color beam and the beam originating from the other one of the first color transmissive beam and the first color reflective beam to form an illumination beam. The light valve is disposed on a transmission path of the illumination beam for converting the illumination beam into an image beam. The projection lens is disposed on a transmission path of the image beam.

In the illumination system and the projection apparatus according to the embodiments of the invention, the first rotation wheel is used to split the first color beam, and at least a part of the first color beam is used to excite the first phosphor element, so that the illumination system is capable of achieving high brightness and the projection apparatus is capable of providing images with high brightness.

Other objectives, features and advantages of the present invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIGS. 2A and 2B are two timing diagrams of the illumination system in FIG. 1A.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1A:
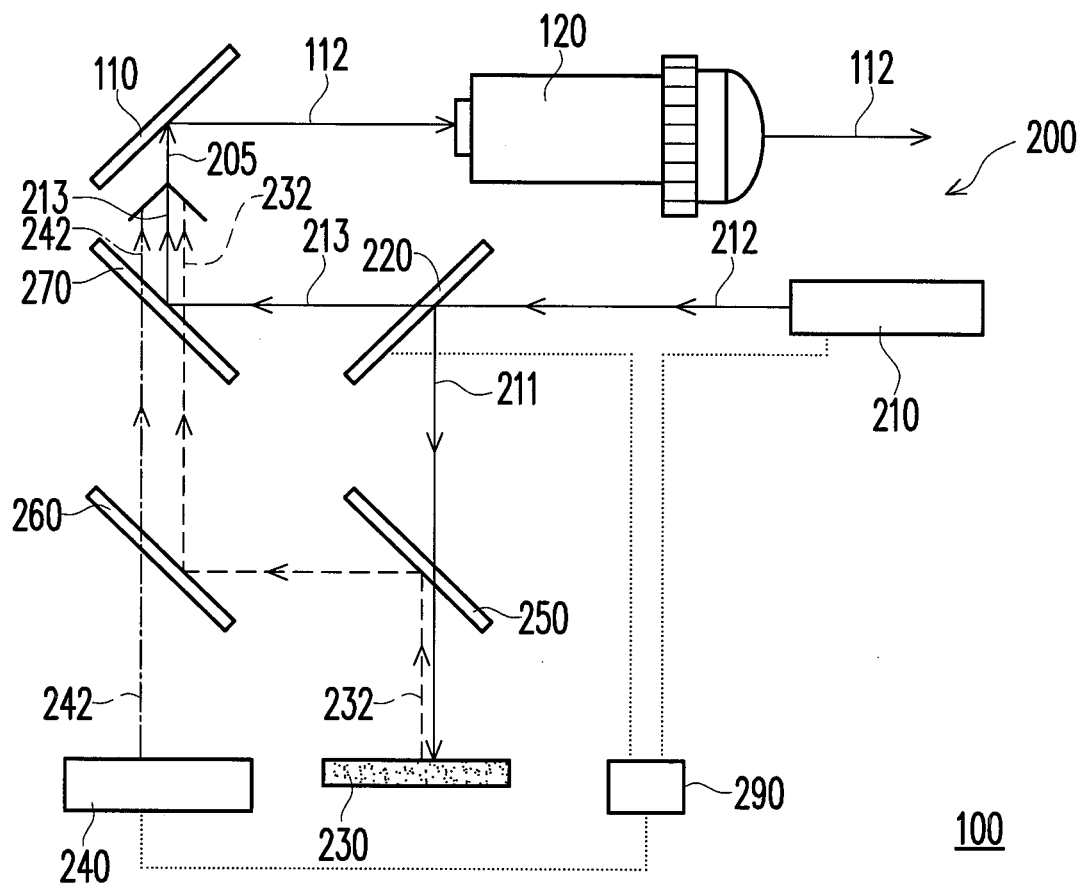
FIG. 1A is a schematic view of a projection apparatus according to an embodiment of the invention.
Figure 1B:
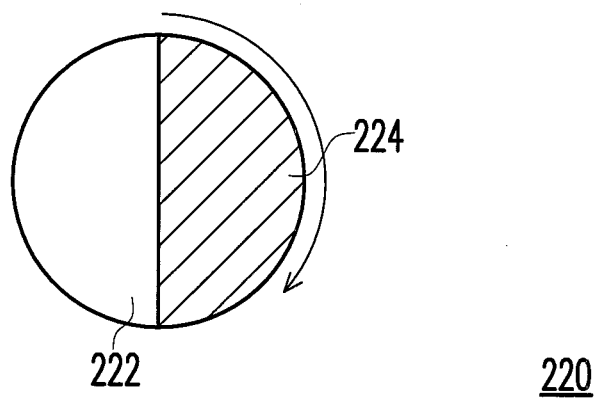
FIG. 1B is a front view of the first rotation wheel in FIG. 1A.

FIG. 1A is a schematic view of a projection apparatus according to an embodiment of the invention, and FIG. 1B is a front view of the first rotation wheel in FIG. 1A. Referring to FIGS. 1A and 1B, the projection apparatus 100 of this embodiment includes an illumination system 200, a light valve 110, and a projection lens 120. The illumination system 200 includes a first light source 210, a first rotation wheel 220, a first phosphor element 230, and a light combining element 270. The first light source 210 is capable of emitting a first color beam 212. In this embodiment, the first light source 210 is, for example, a laser diode (LD) or a light-emitting diode (LED). Moreover, in this embodiment, the first color beam 212 is, for example, a blue beam. However, in other embodiments, the color of the first color beam 212 may be another appropriate color beam.

The first rotation wheel 220 is disposed on a transmission path of the first color beam 212 and includes a first transmissive region 222 and a first reflective region 224. The first transmissive region 222 is capable of allowing the first color beam 212 to pass through so as to form a first color transmissive beam 213. The first reflective region 224 is capable of reflecting the first color beam 212 to form a first color reflective beam 211. In this embodiment, the first transmissive region 222 may be a transparent area of the first rotation wheel 220, and the first reflective region 224 may be a reflective area of the first rotation wheel 220 having a reflective film or a coating on a substrate, wherein the reflective film is capable of reflecting a light with any color. Alternatively, the first reflective region 224 may be a reflective area of the first rotation wheel 220 having a dichroic film on a substrate, wherein the dichroic film is capable of reflecting the first color beam 212 and allowing a light with a wavelength different from the wavelength of the first color beam 212 to pass through. The first transmissive region 222 and the first reflective region 224 alternately pass through the transmission path of the first color beam 212 when the first rotation wheel 220 rotates.

Figure 3:
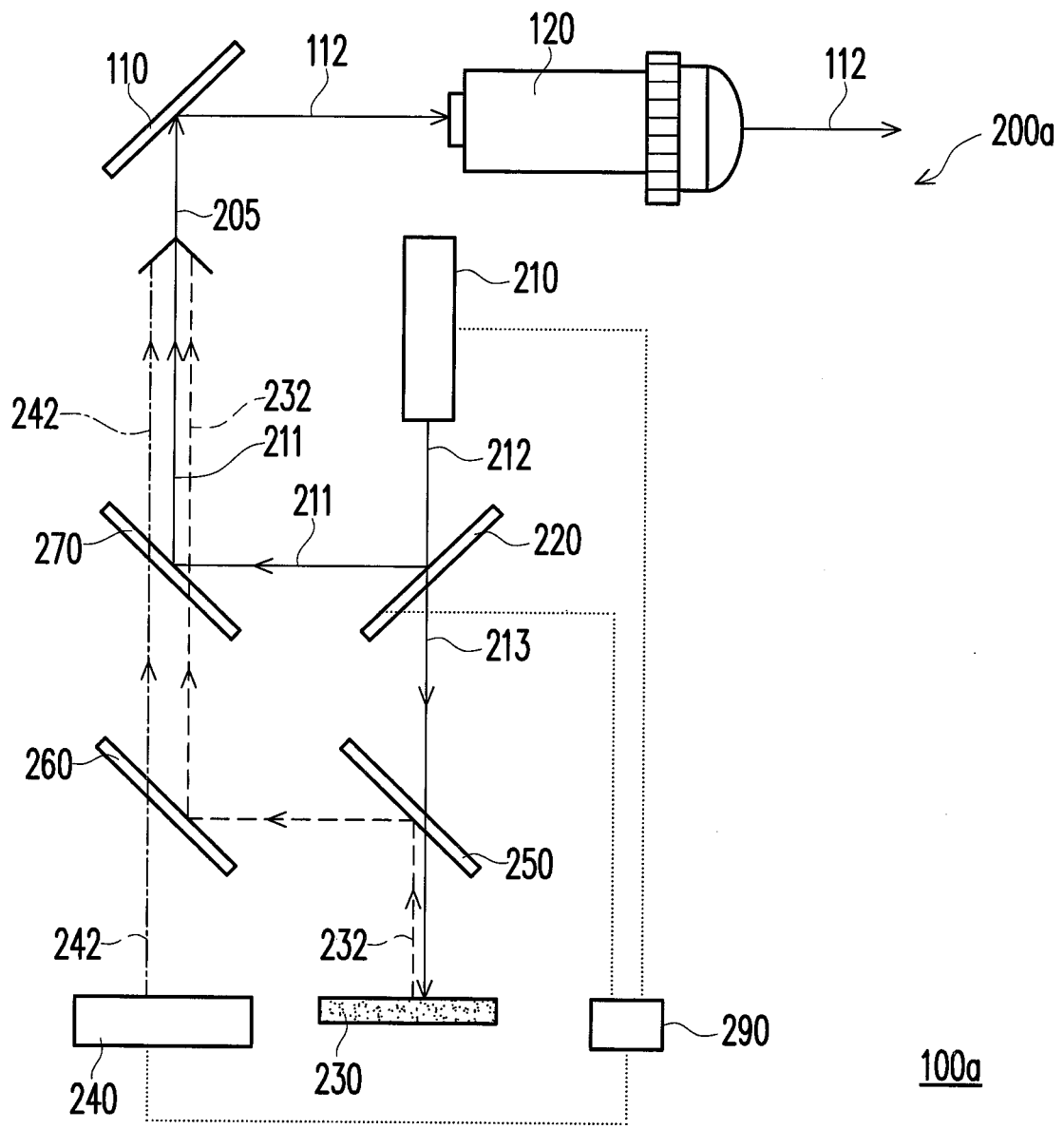
FIG. 3 is a schematic view of a projection apparatus according to another embodiment of the invention.

Referring to FIGS. 1A and 3, one of the first color transmissive beam 213 and the first color reflective beam 211 (the first color reflective beam 211 is taken as an example in this embodiment) excites the first phosphor element 230 to form a second color beam 232, and the color of the first color beam 211 is different from the color of the second color beam 232. In this embodiment, the wavelength of the first color beam 211 is shorter than the wavelength of the second color beam 232. For example, the second color beam 232 is a green beam. However, in other embodiments, the second color beam may also be a beam with another appropriate color. In this embodiment, the first phosphor element may include a reflector and a phosphor layer formed on the reflector, so that the excited second color beam 232 is reflected by this reflector. The light combining element 270 combines at least the second color beam 232 and a beam originating from the other one of the first color transmissive beam 213 and the first color reflective beam 211 (the first color transmissive beam 213 is taken as an example in this embodiment) to form an illumination beam 205.

In this embodiment, the illumination system 200 further includes a second light source 240 capable of emitting a third color beam 242, wherein the color of the third color beam 242 is different from the color of the first color beam 212 and different from the color of the second color beam 232. For example, the third color beam 242 is, for example, a red beam. However, in other embodiments, the third color beam 242 may be a beam with another appropriate color. For instance, the second color beam 232 may be a red beam, and the third color beam 242 may be a green beam. In this embodiment, the second light source 240 may be an LED or an LD. In this embodiment, the light combining element 270 combines at least the second color beam 232, the third color beam 242, and the other one of the first color transmissive beam 213 and the first color reflective beam 211 (the first color transmissive beam 213 is taken as an example in this embodiment) to form the illumination beam 205. In other words, the light combining element 270 combines a red beam, a green beam, and a blue beam to form the illumination beam 205. It should be noted that the light combining element 270 "combining" the second color beam 232, the third color beam 242, and the first color transmissive beam 213 may mean that the three beams are emitted simultaneously and mixed to form the illumination beam 205 (e.g., that the red, green, and blue beams are mixed to form a white illumination beam), but may alternatively mean that the three beams are emitted in turn, wherein the periods respectively of the three beams being emitted do not overlap with each other, or at least two of the three periods partially overlap with each other.

In this embodiment, the light combining element 270 is a dichroic element, e.g. a dichroic mirror or a dichroic prism, which reflects the first color transmissive beam 213 and allows the second color beam 232 and the third color beam 242 to pass through. However, in another embodiment, the light combining element 270 may allow the first color transmissive beam 213 to pass through and reflect the second color beam 232 and the third color beam 242. Alternatively, the light combining element 270 may reflect one of the three beams and allow the other two of the three beams to pass through, or may reflect two of the three beams and allow the other one of the three beams to pass through.

In this embodiment, the illumination system 100 further includes a first dichroic element 250 and a second dichroic element 260. The first dichroic element 250 allows the one of the first color transmissive beam 213 and the first color reflective beam 211 (the first color reflective beam 211 is taken as an example in this embodiment) to transmit from the first rotation wheel 220 to the first phosphor element 230, and the first dichroic element 250 allows the second color beam 232 to transmit from the first phosphor element 230 to the second dichroic element 260. In this embodiment, the first dichroic element 250 allows the first color reflective beam 211 to pass through and reflects the second color beam 232. However, in other embodiments, the first dichroic element 250 may reflect the first color reflective beam 211 and allow the second color beam 232 to pass through.

The second dichroic element 260 allows the third color beam 242 to transmit from the second light source 240 to the light combining element 270, and the second dichroic element 260 allows the second color beam 232 from the first dichroic element 250 to transmit to the light combining element 270. In this embodiment, the second dichroic element 260 allows the third color beam 242 to pass through and reflect the second color beam 232. However, in other embodiments, the second dichroic element 260 may reflect the third color beam 242 and allow the second color beam 232 to pass through. Each of the first dichroic element 250 and the second dichroic element 260 is, for example, a dichroic mirror or a dichroic prism.

The light valve 110 is disposed on a transmission path of the illumination beam 205 for converting the illumination beam 205 into an image beam 112. In this embodiment, the light valve 110 is, for example, a digital micro-mirror device (DMD), a liquid-crystal-on-silicon (LCOS) panel, or another spatial light modulator. The projection lens 120 is disposed on a transmission path of the image beam 112 for projecting the image beam 112 onto a screen (not shown). As a result, the projection apparatus 100 can project images onto the screen.

In the illumination system 200 and the projection apparatus 100 according to this embodiment, the first rotation wheel 220 is used to split the first color beam 212, and at least a part of the first color beam 212 is used to excite the first phosphor element 230, so that the illumination system 200 is capable of achieving high brightness and the projection apparatus 100 is capable of providing images with high brightness. When the first light source 210 is an LD, the brightness is further increased since the LD emits the first color beam with higher energy, and since the first color beam with higher energy excites the first phosphor element 230 to form the second color beam 232 with higher energy.

FIGS. 2A and 2B are two timing diagrams of the illumination system in FIG. 1A. First, referring to FIGS. 1A, 1B, and 2A, the illumination system 100 further includes a control unit 290 electrically coupled to the first rotation wheel 220, the first light source 210, and the second light source 240. The control unit 290 is configured to maintain the first light source 210 in an on-state and the second light source 240 in an off-state when the first color beam 212 strikes the first reflective region 224, i.e., in the period P1 shown in FIG. 2A. Moreover, the control unit 290 is configured to maintain the first light source 210 in the off-state and the second light source 240 in the on-state in a part of a period P2 of the first color beam 212 striking the first transmissive region 222, i.e. in a sub-period P21 of the period P2 shown in FIG. 2A. Furthermore, the control unit 290 is configured to maintain the first light source 210 in the on-state and the second light source 240 in the off-state in another part of the period P2 of the first color beam 212 striking the first transmissive region 222, i.e. in a sub-period P22 of the period P2 shown in FIG. 2A. As a result, in this embodiment, in the period P1, the first color reflective beam 211 excites the first phosphor element 230, so that the illumination system 200 provides a green beam. In the sub-period P21, the second light source 240 emits the third color beam 242, so that the illumination system 200 provides a red beam. In the sub-period P22, the first color beam 212 passes through the first transmissive region 222 to form the first color transmissive beam 213, so that the illumination system 200 provides a blue beam. When the period P1, the sub-period P21, and the sub-period P22 repeats again and again in sequence, and when each of the period P1, the sub-period P21, and the sub-period P22 is shorter than the time of persistence of vision of humans, the projection apparatus 100 is capable of projecting full color images. It should be noted that the sequence of the period P1, the sub-period P21, and the sub-period P22 is not limited to that shown in FIG. 2A. In other embodiments, the sequence of the period P1, the sub-period P21, and the sub-period P22 may be any other sequences, e.g. that the sub-period P22 may follow the period P1, and the sub-period P21 follows the sub-period P22.

In another embodiment, referring to FIGS. 1A, 1B, and 2B, the control unit 290 is configured to maintain the first light source 210 in an on-state and the second light source 240 in an off-state in a part of a period P1 of the first color beam 212 striking the first reflective region 22, i.e. in a sub-period P11 of the period P1 as shown in FIG. 2B. Moreover, the control unit 290 is configured to maintain the first light source 210 in the on-state and the second light source 240 in the on-state in another part of the period P1 of the first color beam 212 striking the first reflective region 224, i.e. in a sub-period P12 of the period P1 shown in FIG. 2B. In addition, the control unit 290 is configured to maintain the first light source 210 in the off-state and the second light source 240 in the on-state in a part of a period P2 of the first color beam 212 striking the first transmissive region 222, i.e. in a sub-period P21 of the period P2 shown in FIG. 2B. Furthermore, the control unit 290 is configured to maintain the first light source 210 in the on-state and the second light source 240 in the off state in another part of the period P2 of the first color beam 212 striking the first transmissive region 222, i.e. in a sub-period P22 of the period P2. As a result, in this embodiment, in the sub-period P11, the first color reflective beam 211 excites the first phosphor element 230, so that the illumination system 200 provides a green beam. In the sub-period P12, not only does the first color reflective beam 211 excite the first phosphor element 230, but also the second light source 240 emits the third color beam 242, so that the illumination system 200 provides a yellow beam mixed by the green beam and a red beam. In the sub-period P21, the second light source 240 emits the third color beam 242, so that the illumination system 200 provides a red beam. In the sub-period P22, the first color beam 212 passes through the first transmissive region 222 to form the first color transmissive beam 213, so that the illumination system 200 provides a blue beam. When the sub-period P11, the sub-period P12, the sub-period P21, and the sub-period P22 repeat again and again in sequence, and when each of the sub-period P11, the sub-period P12, the sub-period P21, and the sub-period P22 is shorter than the time of persistence of vision of humans, the projection apparatus 100 is capable of projecting full color images with four primary color, i.e. red, green, blue, and yellow.

In yet another embodiment, the control unit 290 may also be configured to maintain the first light source 210 in the on-state and the second light source 240 in the on-state in a part of the period P2, so that the illumination system 200 may provide a magenta beam mixed from the blue beam and the red beam.

It should be noted that the sequence of the sub-period P11, the sub-period P12, the sub-period P21, and the sub-period P22 is not limited to that shown in FIG. 2B. In other embodiments, the sequence of the sub-period P11, the sub-period P12, the sub-period P21, and the sub-period P22 may be any other sequences, e.g. that the sub-period P22 may follow the sub-period P12, and the sub-period P21 follows the sub-period P22.

FIG. 3 is a schematic view of a projection apparatus according to another embodiment of the invention. Referring to FIG. 3, a projection apparatus 100a in this embodiment is similar to the projection apparatus 100 in FIG. 1A, and the difference therebetween is as follows. In this embodiment, in the illumination system 200a, the first color transmissive beam 213 excites the first phosphor element 230 to form the second color beam 232, and the light combining element 270 combines at least the first color reflective beam 211, the second color beam 232 and the third color beam 242 to form the illumination beam 205. Moreover, the timing diagrams of the illumination system 200a may be referred to FIGS. 2A and 2B but the reflective region section and the transmissive region section are exchanged, i.e. that the first color beam 212 strikes the transmissive region 222 in the period P1, and strikes the reflective region 224 in the period P2.

Figure 4A:
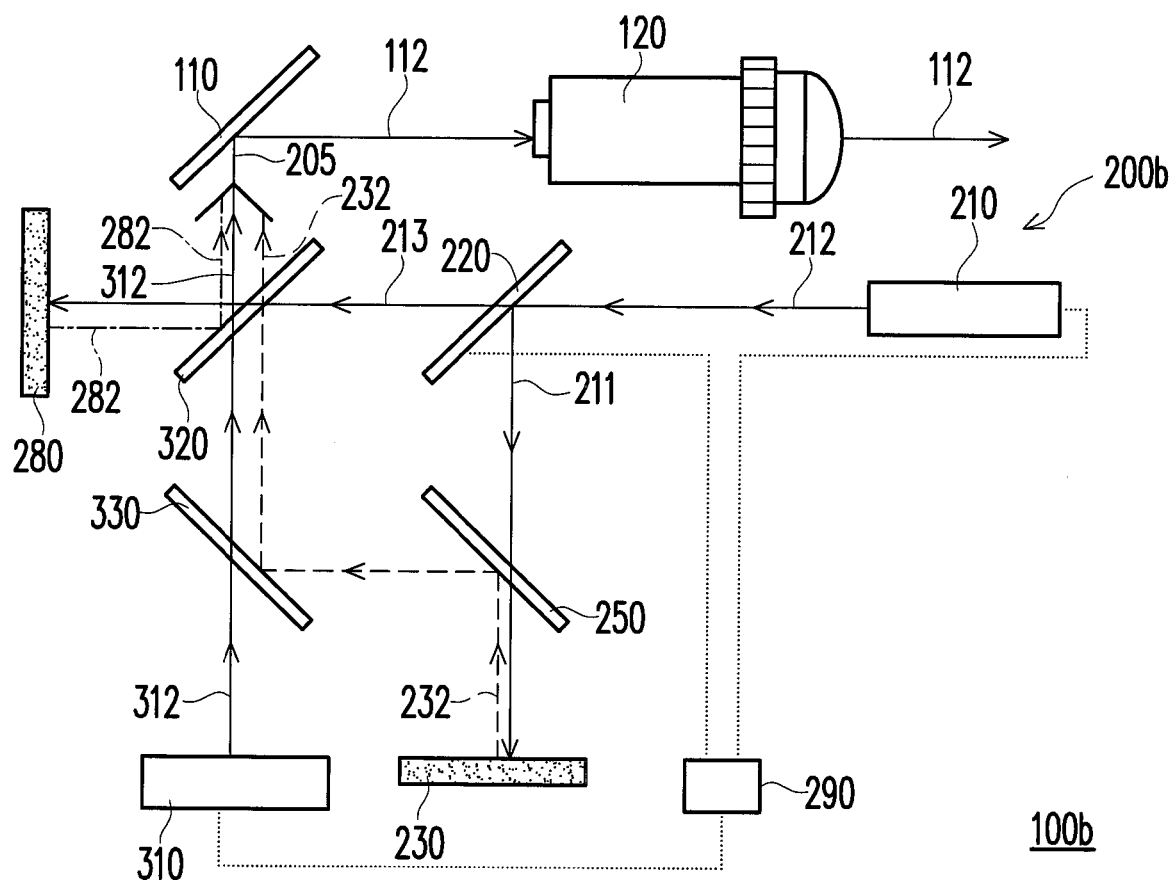
FIG. 4A is a schematic view of a projection apparatus according to yet another embodiment of the invention.
Figure 4B:
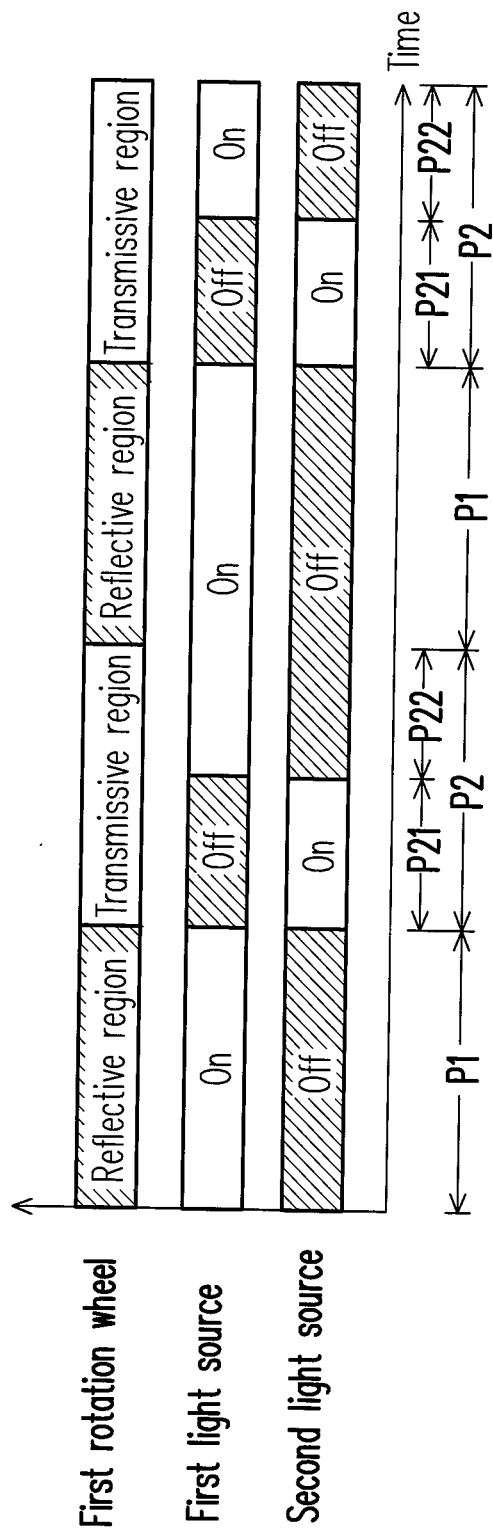
FIG. 4B is a timing diagram of the illumination system in FIG. 4A.

FIG. 4A is a schematic view of a projection apparatus according to yet another embodiment of the invention, and FIG. 4B is a timing diagram of the illumination system in FIG. 4A. Referring to FIGS. 4A and 4B, the projection apparatus 100b in this embodiment is similar to the projection apparatus 100 in FIG. 1A, and the difference therebetween is as follows. An illumination system 100b of the projection apparatus 100b further includes a second phosphor element 280, wherein the other one of the first color transmissive beam 213 and the first color reflective beam 211 (the first color transmissive beam 213 is taken as an example in this embodiment) excites the second phosphor element 280 to form a third color beam 282, and the color of the third color beam 282 is different from the color of the first color beam 212 and different from the color of the second color beam 232. In this embodiment, the wavelength of the first color beam 211 is shorter than the wavelength of the third color beam 282. For example, the third color beam 282 is a red beam. However, in other embodiments, the third color beam 282 may also be a beam with another appropriate color. For example, the second color beam 232 may be a red beam, and the third color beam 282 may be a green beam. In this embodiment, the second phosphor element 280 may include a reflector and a phosphor layer formed on the reflector, so that the excited third color beam 282 is reflected by this reflector.

In this embodiment, a second light source 310 is capable of emitting a fourth color beam 312, wherein a light combining element 320 combines at least the second color beam 232, the third color beam 282, and the fourth color beam 312 to form the illumination beam 205. In this embodiment, the second light source 210 is, for example, an LED or an LD. Moreover, in this embodiment, the color of the fourth color beam 312 is the same as the color of the first color beam 212. For example, each of the fourth color beam 312 and the first color beam 212 is a blue beam. However, in another embodiment, the color of the fourth color beam 312 is different from the color of the first color beam 212. For instance, the first color beam 212 may be an ultraviolet (UV) beam, and the fourth color beam 312 is a blue beam.

In this embodiment, the illumination system 200b further includes a second dichroic element 330 allowing the fourth color beam 312 from the second light source 310 to transmit to the light combining element 320. Moreover, the first dichroic element 250 allows the second color beam 232 to transmit from the first phosphor element 230 to the second dichroic element 330, and the second dichroic element 330 allows the second color beam 232 to transmit from the first dichroic element 250 to the light combining element 320. In this embodiment, the second dichroic element 330 is a dichroic mirror or a dichroic prism, and allows the fourth color beam 312 to pass through, and reflects the second color beam 232. However, in another embodiment, the second dichroic element 330 may reflect the fourth color beam 312, and allow the second color beam 232 to pass through.

Moreover, the light combining element 320 allows the other one of the first color transmissive beam 213 and the first color reflective beam 211 (the first color transmissive beam 213 is taken as an example in this embodiment) to transmit from the first rotation wheel 220 to the second phosphor element 280. In this embodiment, the light combining element 320 is a dichroic element, e.g. a dichroic mirror or a dichroic prism, which reflects the third color beam 282 and allows the second color beam 232, the fourth color beam 312, and the first color transmissive beam 213 to pass through. However, in another embodiment, the light combining element 320 may reflect one of the four beams and allow the other three of the four beams to pass through, or may reflect two of the four beams and allow the other two of the four beams to pass through, or may reflect three of the four beams and allow the other one of the four beams to pass through.

In this embodiment, the control unit 290 is electrically coupled to the first rotation wheel 220, the first light source 210, and the second light source 310. The control unit 290 is configured to maintain the first light source 210 in an on-state and the second light source 310 in an off-state when the first color beam 212 strikes the first reflective region 224, i.e. in a period P1 shown in FIG. 4B. Moreover, the control unit 290 is configured to maintain the first light source 210 in the off-state and the second light source 310 in the on-state in a part of a period P2 of the first color beam striking the first transmissive region 222, i.e. in a sub-period P21 of the period P2 shown in FIG. 4B. Furthermore, the control unit 290 is configured to maintain the first light source 210 in the on-state and the second light source 310 in the off-state in another part of the period P2 of the first color beam 212 striking the first transmissive region 222, i.e. in a sub-period P22 of the period P2 shown in FIG. 4B. As a result, in the period P1, the first color reflective beam 211 excites the first phosphor element 230 to form the second color beam 232, so that the illumination system 200b provides a green beam. In the sub-period P21, the second light source 310 emits the fourth color beam 312, so that the illumination system 200b provides a blue beam. Moreover, in the sub-period P22, the first color transmissive beam 213 excites the second phosphor element 280 to form the third color beam 282, so that the illumination system 200b provides a red beam. When the period P1, the sub-period P21, and the sub-period P22 repeat again and again in sequence, and when each of the period P1, the sub-period P21, and the sub-period P22 is shorter than the time of persistence of vision of humans, the projection apparatus 100b is capable of projecting full color images. In another embodiment, both the first light source 210 and the second light source 310 may be maintained in the on-state in a part of the period P1 or P2. Moreover, in another embodiment, the reflective region section and the transmissive region section in FIG. 4B may be exchanged, i.e., the reflective region section corresponds to the period P2, and the transmissive region section corresponds to the period P1.

It should be noted that the sequence of the period P1, the sub-period P21, and the sub-period P22 is not limited to that shown in FIG. 4B. In other embodiments, the sequence of the period P1, the sub-period P21, and the sub-period P22 may be any other sequences, e.g. that the sub-period P22 may follow the period P1, and the sub-period P21 follows the sub-period P22.

Figure 5:
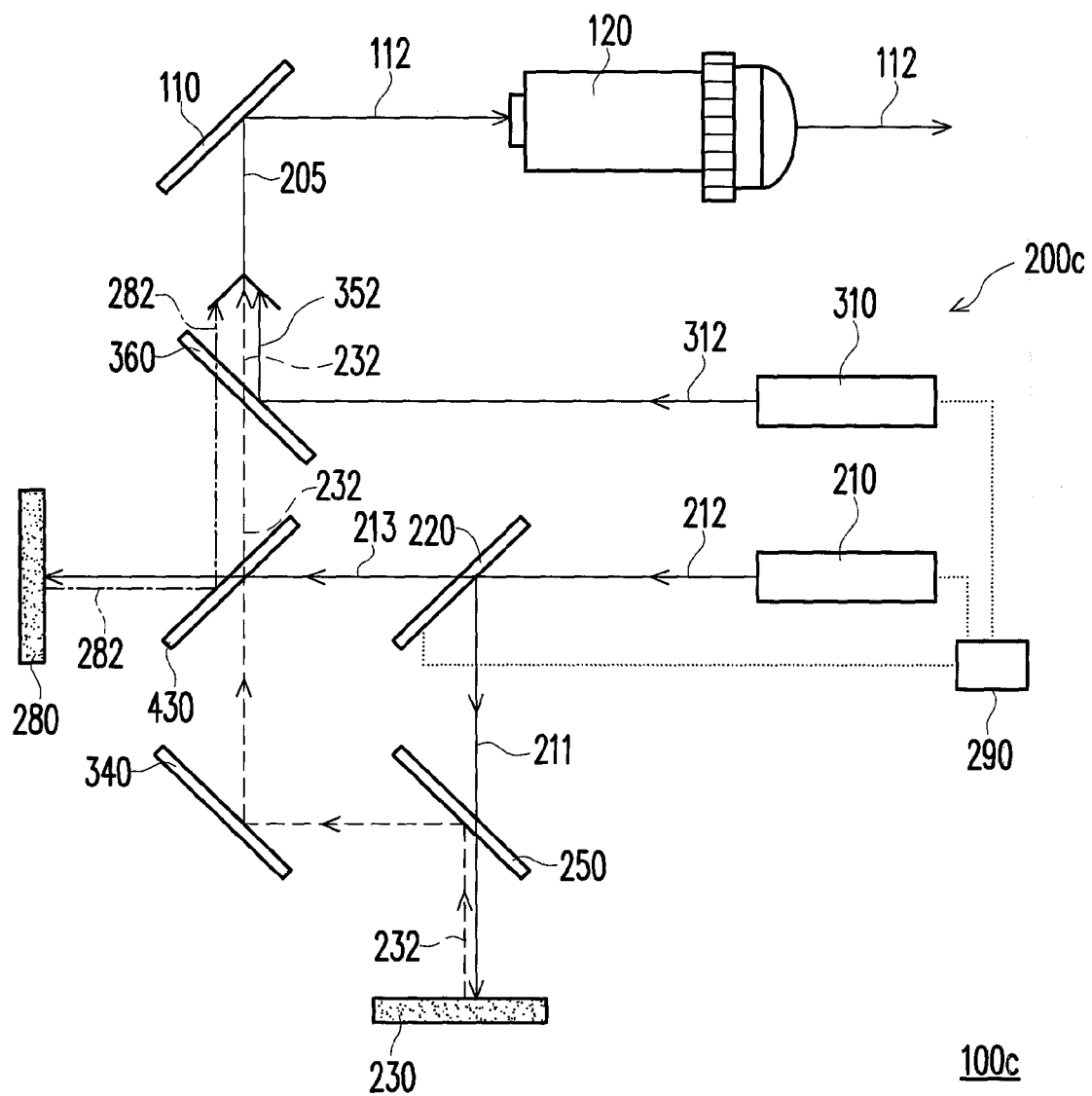
FIG. 5 is a schematic view of a projection apparatus according to still another embodiment of the invention.

FIG. 5 is a schematic view of a projection apparatus according to still another embodiment of the invention. Referring to FIG. 5, the projection apparatus 100c in this embodiment is similar to the projection apparatus 100b in FIG. 4A, and the difference therebetween is as follows. In the projection apparatus 100c, an illumination system 200c further includes a second dichroic element 430 allowing the other one of the first color transmissive beam 213 and the first color reflective beam 211 (the first color transmissive beam 213 is taken as an example in this embodiment) to transmit from the first rotation wheel 220 to the second phosphor element 280 and allowing the third color beam 282 to transmit from the second phosphor element 280 to a light combining element 360. Moreover, the first dichroic element 250 allows the second color beam 232 to transmit from the first phosphor element 230 to the second dichroic element 430, and the second dichroic element 430 allows the second color beam 232 to transmit from the first phosphor element 230 to the light combining element 360. In this embodiment, each of the second color beam 232 and the light combining element 360 is, for example, a dichroic mirror or a dichroic prism. In this embodiment, the second dichroic element 430 allows the first color transmissive beam 213 to pass through and reflects the third color beam 282. However, in another embodiment, the second dichroic element 430 may reflect the first color transmissive beam 213 and allows the third color beam 282 to pass through. Moreover, in this embodiment, the light combining element 360 allows the second color beam 232 and the third color beam 282 to pass through, and reflects the fourth color beam 312 from the second light source 310. However, in other embodiments, the light combining element 360 may reflect one of the second, third, and fourth color beams 232, 282, and 312, and allow the other two thereof to pass through, or may reflect two of the second, third, and fourth color beams 232, 282, and 312, and allow the other one thereof to pass through.

In this embodiment, the illumination system 200c further includes a reflector 340 reflecting the second color beam 232 from the first dichroic element 250 to the second dichroic element 232. The reflector 340 is, for example, a mirror, a dichroic mirror, or a dichroic prism.

The timing diagram of the illumination system 200c is the same as the embodiment of FIG. 4B and not repeated herein.

Figure 6A:
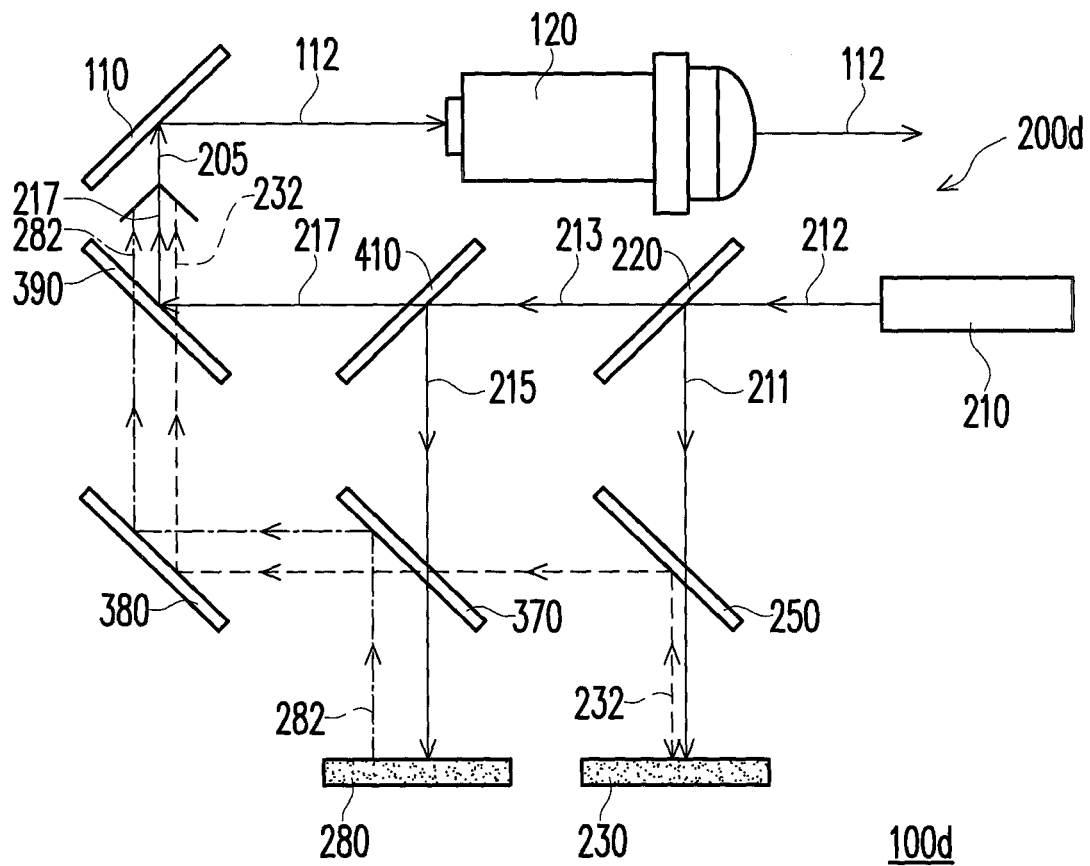
FIG. 6A is a schematic view of a projection apparatus according to yet still another embodiment of the invention.
Figure 6B:
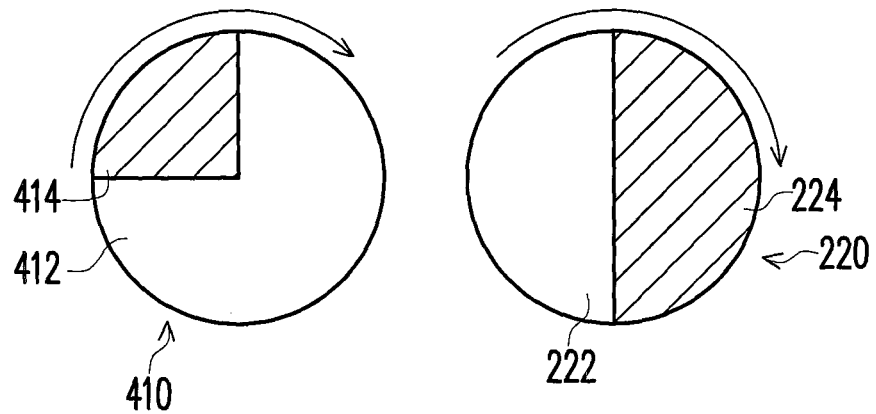
FIG. 6B is a front view of the first rotation wheel and the second rotation wheel in FIG. 6A.

FIG. 6A is a schematic view of a projection apparatus according to yet still another embodiment of the invention, and FIG. 6B is a front view of the first rotation wheel and the second rotation wheel in FIG. 6A. Referring to FIGS. 6A and 6B, the projection apparatus 100d in this embodiment is similar to the projection apparatus 100b in FIG. 4A, and the difference therebetween is as follows. In this embodiment, an illumination system 200d of the projection apparatus 100d further includes a second rotation wheel 410 disposed on the transmission path of the other one of the first color transmissive beam 213 and the first color reflective beam 211 (the first transmissive beam 213 is taken as an example in this embodiment). The second rotation wheel 410 includes a second transmissive region 412 and a second reflective region 414. The second transmissive region 412 is capable of allowing the other one of the first color transmissive beam 213 and the first color reflective beam 211 (the first transmissive beam 213 is taken as an example in this embodiment) to pass through so as to form a first color sub-transmissive beam 217. The second reflective region 414 is capable of reflecting the other one of the first color transmissive beam 213 and the first color reflective beam 211 (the first transmissive beam 213 is taken as an example in this embodiment) to form a first color sub-reflective beam 215, wherein the second transmissive region 412 and the second reflective region 414 alternately pass through the transmission path of the other one of the first color transmissive beam 213 and the first color reflective beam 211 (the first transmissive beam 213 is taken as an example in this embodiment) when the second rotation wheel 410 rotates. In this embodiment, the second transmissive region 412 may be a transparent area of the second rotation wheel 410, and the second reflective region 414 may be a reflective area of the second rotation wheel 410 having a reflective film on a substrate, wherein the reflective film is capable of reflecting a light with any color. Alternatively, the second reflective region 414 may be a reflective area of the second rotation wheel 410 having a dichroic film on a substrate, wherein the dichroic film is capable of reflecting the first color transmissive beam 213 and allowing a light with a wavelength different from the wavelength of the first color transmissive beam 213 to pass through. In this embodiment, the second transmissive region 412 and the second reflective region 414 alternately pass through the transmission path of the other one of the first color transmissive beam 213 and the first color reflective beam 211 in the periods of the first color beam 212 striking the first rotation wheel 220 to form the other one of the first color transmissive beam 213 and the first color reflective beam 211, e.g. in the periods of the first color beam 212 passing through the first transmissive region 222 to form the first color transmissive beam 213 in this embodiment.

One of the first color sub-transmissive beam 217 and the first color sub-reflective beam 215 (the first color sub-reflective beam 215 is taken as an example in this embodiment) excites the second phosphor element 280 to form the third color beam 282. An light combining element 390 combines at least the second color beam 232, the third color beam 282, and the other one of the first color sub-transmissive beam 217 and the first color sub-reflective beam 215 (the first color sub-transmissive beam 217 is taken as an example in this embodiment) to form the illumination beam 205.

In this embodiment, the illumination system 200d further includes a second dichroic element 370 allowing the one of the first color sub-transmissive beam 217 and the first color sub-reflective beam 215 (the first color sub-reflective beam 215 is taken as an example in this embodiment) to transmit to the second phosphor element 280, allowing the third color beam 282 to transmit from the second phosphor element 280 to a light combining element 390. The first dichroic element 250 allows the second color beam 232 to transmit from the first phosphor element 230 to the second dichroic element 370, and the second dichroic element 370 allows the second color beam 232 to transmit from the first dichroic element 250 to the light combining element 390. Moreover, in this embodiment, the illumination system 200d further includes a reflector 380 reflecting the second color beam 232 from the second dichroic element 370 to the light combining element 390 and reflecting the third color beam 282 from the second dichroic element 370 to the light combining element 390.

In this embodiment, each of the second dichroic element 370 and the light combining element 390 is a dichroic mirror or a dichroic prism. Moreover, in this embodiment, the second dichroic element 370 allows the second color beam 232 and the first color sub-reflective beam 215 to pass through and reflects the third color beam 282. However, in other embodiments, the second dichroic element 270 may allow two of the second color beam 232, the first color sub-reflective beam 215, and the third color beam 282 to pass through and reflect the other one thereof, or may allow one of the second color beam 232, the first color sub-reflective beam 215, and the third color beam 282 to pass through and reflect the other two thereof. In addition, in this embodiment, the light combining element 390 reflects the first color sub-transmissive beam 217 and allows the second color beam 232 and the third color beam 282 to pass through. However, in other embodiments, the light combining element 390 may allow two of the second color beam 232, the third color beam 282, and the first color sub-transmissive beam 217 to pass through and reflect the other one thereof, or may allow one of the second color beam 232, the third color beam 282, and the first color sub-transmissive beam 217 to pass through and reflect the other two thereof.

Besides, in this embodiment, the reflector 380 may be a mirror or a dichroic element capable of reflecting the second color beam 232 and a third color beam 282.

In view of the above, in the illumination system and the projection apparatus according to the embodiments of the invention, the first rotation wheel is used to split the first color beam, and at least a part of the first color beam is used to excite the first phosphor element, so that the illumination system is capable of achieving high brightness and the projection apparatus is capable of providing images with high brightness. In an embodiment, when the first light source is an LD, the brightness is further increased since the LD emits the first color beam with higher energy, and since the first color beam with higher energy excites the first phosphor element to form the second color beam with higher energy.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims. Moreover, these claims may refer to use "first", "second", etc. following with noun or element. Such terms should be understood as a nomenclature and should not be construed as giving the limitation on the number of the elements modified by such nomenclature unless specific number has been given.

What is claimed is:

1. An illumination system, comprising:
   a first light source capable of emitting a first color beam;
   a first rotation wheel disposed on a transmission path of the first color beam and the first rotation wheel comprising:
      a first transmissive region capable of allowing the first color beam to pass through so as to form a first color transmissive beam; and
      a first reflective region capable of reflecting the first color beam to form a first color reflective beam, wherein the first transmissive region and the first reflective region alternately pass through the transmission path of the first color beam when the first rotation wheel rotates;
   a first phosphor element, wherein one of the first color transmissive beam and the first color reflective beam excites the first phosphor element to form a second color beam, and a color of the first color beam is different from a color of the second color beam; and
   a light combining element combining the second color beam and a beam originating from the other one of the first color transmissive beam and the first color reflective beam.

2. The illumination system according to claim 1 further comprising a second light source capable of emitting a third color beam, wherein a color of the third color beam is different from the color of the first color beam and different from the color of the second color beam, the light combining element combines the second color beam, the third color beam, and the other one of the first color transmissive beam and the first color reflective beam.

3. The illumination system according to claim 2 further comprising a control unit electrically coupled to the first rotation wheel, the first light source, and the second light source, wherein the control unit is configured to maintain the first light source in an on-state and the second light source in an off-state when the first color beam strikes one of the first transmissive region and the first reflective region, configured to maintain the first light source in the off-state and the second light source in the on-state in a part of a period of the first color beam striking the other one of the first transmissive region and the first reflective region, and configured to maintain the first light source in the on-state and the second light source in the off-state in another part of the period of the first color beam striking the other one of the first transmissive region and the first reflective region.

4. The illumination system according to claim 2 further comprising a control unit electrically coupled to the first rotation wheel, the first light source, and the second light source, wherein the control unit is configured to maintain the first light source in an on-state and the second light source in an off-state in a part of a first period of the first color beam striking one of the first transmissive region and the first reflective region, configured to maintain the first light source in the on-state and the second light source in the on-state in another part of the first period of the first color beam striking the one of the first transmissive region and the first reflective region, configured to maintain the first light source in the off-state and the second light source in the on-state in a part of a second period of the first color beam striking the other one of the first transmissive region and the first reflective region, and configured to maintain the first light source in the on-state and the second light source in the off-state in another part of the second period of the first color beam striking the other one of the first transmissive region and the first reflective region.

5. The illumination system according to claim 2 further comprising:

a first dichroic element allowing the one of the first color transmissive beam and the first color reflective beam to transmit from the first rotation wheel to the first phosphor element; and a second dichroic element allowing the third color beam from the second light source to travel to the light combining element, wherein the first dichroic element allows the second color beam to transmit from the first phosphor element to the second dichroic element, and the second dichroic element allows the second color beam from the first dichroic element to travel to the light combining element.

6. The illumination system according to claim 1 further comprising:

a second phosphor element, wherein the other one of the first color transmissive beam and the first color reflective beam excites the second phosphor element to form a third color beam, and a color of the third color beam is different from the color of the first color beam and different from the color of the second color beam; and a second light source capable of emitting a fourth color beam, wherein the light combining element combines the second color beam, the third color beam, and the fourth color beam.

7. The illumination system according to claim 6, wherein a color of the fourth color beam is the same as the color of the first color beam.

8. The illumination system according to claim 6, wherein a color of the fourth color beam is different from the color of the first color beam.

9. The illumination system according to claim 6 further comprising:

a first dichroic element allowing the one of the first color transmissive beam and the first color reflective beam to transmit from the first rotation wheel to the first phosphor element; and a second dichroic element allowing the fourth color beam from the second light source to travel to the light combining element, wherein the first dichroic element allows the second color beam to transmit from the first phosphor element to the second dichroic element, and the second dichroic element allows the second color beam to transmit from the first dichroic element to the light combining element;

wherein the light combining element allows the other one of the first color transmissive beam and the first color reflective beam to transmit from the first rotation wheel to the second phosphor element.

10. The illumination system according to claim 6 further comprising:

a first dichroic element allowing the one of the first color transmissive beam and the first color reflective beam to transmit from the first rotation wheel to the first phosphor element; and a second dichroic element allowing the other one of the first color transmissive beam and the first color reflective beam to transmit from the first rotation wheel to the second phosphor element and allowing the third color beam to transmit from the second phosphor element to the light combining element, wherein the first dichroic element allows the second color beam to transmit from the first phosphor element to the second dichroic element, and the second dichroic element allows the second color beam to transmit from the first phosphor element to the light combining element.

11. The illumination system according to claim 10 further comprising a reflector reflecting the second color beam from the first dichroic element to the second dichroic element.

12. The illumination system according to claim 6 further comprising a control unit electrically coupled to the first rotation wheel, the first light source, and the second light source, wherein the control unit is configured to maintain the first light source in an on-state and the second light source in an off-state when the first color beam strikes one of the first transmissive region and the first reflective region, configured to maintain the first light source in the off-state and the second light source in the on-state in a part of a period of the first color beam striking the other one of the first transmissive region and the first reflective region, and configured to maintain the first light source in the on-state and the second light source in the off-state in another part of the period of the first color beam striking the other one of the first transmissive region and the first reflective region.

13. The illumination system according to claim 1 further comprising:

a second rotation wheel disposed on a transmission path of the other one of the first color transmissive beam and the first color reflective beam and comprising:

a second transmissive region capable of allowing the other one of the first color transmissive beam and the first color reflective beam to pass through so as to form a first color sub-transmissive beam; and a second reflective region capable of reflecting the other one of the first color transmissive beam and the first color reflective beam to form a first color sub-reflective beam, wherein the second transmissive region and the second reflective region alternately pass through the transmission path of the other one of the first color transmissive beam and the first color reflective beam when the second rotation wheel rotates; and a second phosphor element, wherein one of the first color sub-transmissive beam and the first color sub-reflective beam excites the second phosphor element to form a third color beam, and a color of the third color beam is different from the color of the first color beam and different from the color of the second color beam;

wherein the light combining element combines the second color beam, the third color beam, and the other one of the first color sub-transmissive beam and the first color sub-reflective beam.

14. The illumination system according to claim 13 further comprising:

a first dichroic element allowing the one of the first color transmissive beam and the first color reflective beam to transmit from the first rotation wheel to the first phosphor element; and a second dichroic element allowing the one of the first color sub-transmissive beam and the first color sub-reflective beam to transmit to the second phosphor element, allowing the third color beam to transmit from the second phosphor element to the light combining element, wherein the first dichroic element allows the second color beam to transmit from the first phosphor element to the second dichroic element, and the second dichroic element allows the second color beam to transmit from the first dichroic element to the light combining element.

15. The illumination system according to claim 14 further comprising a reflector reflecting the second color beam from the second dichroic element to the light combining element and reflecting the third color beam from the second dichroic element to the light combining element.

16. The illumination system according to claim 13, wherein the second transmissive region and the second reflective region alternately pass through the transmission path of the other one of the first color transmissive beam and the first color reflective beam in periods of the first color beam striking the first rotation wheel to form the other one of the first color transmissive beam and the first color reflective beam.

17. A projection apparatus comprising:
an illumination system, comprising:
- a first light source capable of emitting a first color beam;
- a first rotation wheel disposed on a transmission path of the first color beam and comprising:
  - a first transmissive region capable of allowing the first color beam to pass through so as to form a first color transmissive beam; and
  - a first reflective region capable of reflecting the first color beam to form a first color reflective beam, wherein the first transmissive region and the first reflective region alternately pass through the transmission path of the first color beam when the first rotation wheel rotates;
- a first phosphor element, wherein one of the first color transmissive beam and the first color reflective beam excites the first phosphor element to form a second color beam, and a color of the first color beam is different from a color of the second color beam; and
- a light combining element combining at least the second color beam and a beam originating from the other one of the first color transmissive beam and the first color reflective beam to form an illumination beam;
a light valve disposed on a transmission path of the illumination beam for converting the illumination beam into an image beam; and
a projection lens disposed on a transmission path of the image beam.

18. The projection apparatus according to claim 17, wherein the illumination system further comprises a second light source capable of emitting a third color beam, a color of the third color beam is different from the color of the first color beam and different from the color of the second color beam, the light combining element combines at least the second color beam, the third color beam, and the other one of the first color transmissive beam and the first color reflective beam to form the illumination beam.

19. The projection apparatus according to claim 18, wherein the illumination system further comprises a control unit electrically coupled to the first rotation wheel, the first light source, and the second light source, wherein the control unit is configured to maintain the first light source in an on-state and the second light source in an off-state when the first color beam strikes one of the first transmissive region and the first reflective region, configured to maintain the first light source in the off-state and the second light source in the on-state in a part of a period of the first color beam striking the other one of the first transmissive region and the first reflective region, and configured to maintain the first light source in the on-state and the second light source in the off-state in another part of the period of the first color beam striking the other one of the first transmissive region and the first reflective region.

20. The projection apparatus according to claim 18, wherein the illumination system further comprises a control unit electrically coupled to the first rotation wheel, the first light source, and the second light source, the control unit is configured to maintain the first light source in an on-state and the second light source in an off-state in a part of a first period of the first color beam striking one of the first transmissive region and the first reflective region, configured to maintain the first light source in the on-state and the second light source in the on-state in another part of the first period of the first color beam striking the one of the first transmissive region and the first reflective region, configured to maintain the first light source in the off-state and the second light source in the on-state in a part of a second period of the first color beam striking the other one of the first transmissive region and the first reflective region, and configured to maintain the first light source in the on-state and the second light source in the off-state in another part of the second period of the first color beam striking the other one of the first transmissive region and the first reflective region.

21. The projection apparatus according to claim 18, wherein the illumination system further comprises:
- a first dichroic element allowing the one of the first color transmissive beam and the first color reflective beam from the first rotation wheel to transmit to the first phosphor element; and
- a second dichroic element allowing the third color beam to transmit from the second light source to the light combining element, wherein the first dichroic element allows the second color beam to transmit from the first phosphor element to the second dichroic element, and the second dichroic element allows the second color beam to transmit from the first dichroic element to the light combining element.

22. The projection apparatus according to claim 17, wherein the illumination system further comprises:
- a second phosphor element, wherein the other one of the first color transmissive beam and the first color reflective beam excites the second phosphor element to form a third color beam, and a color of the third color beam is different from the color of the first color beam and different from the color of the second color beam; and
- a second light source capable of emitting a fourth color beam, wherein the light combining element combines at least the second color beam, the third color beam, and the fourth color beam to form the illumination beam.

23. The projection apparatus according to claim 22, wherein a color of the fourth color beam is the same as the color of the first color beam.

24. The projection apparatus according to claim 22, wherein a color of the fourth color beam is different from the color of the first color beam.

25. The projection apparatus according to claim 22, wherein the illumination system further comprises:
- a first dichroic element allowing the one of the first color transmissive beam and the first color reflective beam from the first rotation wheel to transmit to the first phosphor element; and
- a second dichroic element allowing the fourth color beam to transmit from the second light source to the light combining element, wherein the first dichroic element allows the second color beam to transmit from the first phosphor element to the second dichroic element, and the second dichroic element allows the second color beam to transmit from the first dichroic element to the light combining element;
wherein the light combining element allows the other one of the first color transmissive beam and the first color reflective beam from the first rotation wheel to travel to the second phosphor element.

26. The projection apparatus according to claim 22, wherein the illumination system further comprises:

a first dichroic element allowing the one of the first color transmissive beam and the first color reflective beam to transmit from the first rotation wheel to the first phosphor element; and a second dichroic element allowing the other one of the first color transmissive beam and the first color reflective beam from the first rotation wheel to travel to the second phosphor element and allowing the third color beam from the second phosphor element to travel to the light combining element, wherein the first dichroic element allows the second color beam to transmit from the first phosphor element to the second dichroic element, and the second dichroic element allows the second color beam to transmit from the first phosphor element to the light combining element.

27. The projection apparatus according to claim 26, wherein the illumination system further comprises a reflector reflecting the second color beam from the first dichroic element to the second dichroic element.

28. The projection apparatus according to claim 22, wherein the illumination system further comprises a control unit electrically coupled to the first rotation wheel, the first light source, and the second light source, the control unit is configured to maintain the first light source in an on-state and the second light source in an off-state when the first color beam strikes one of the first transmissive region and the first reflective region, configured to maintain the first light source in the off-state and the second light source in the on-state in a part of a period of the first color beam striking the other one of the first transmissive region and the first reflective region, and configured to maintain the first light source in the on-state and the second light source in the off-state in another part of the period of the first color beam striking the other one of the first transmissive region and the first reflective region.

29. The projection apparatus according to claim 17, wherein the illumination system further comprises:
a second rotation wheel disposed on a transmission path of the other one of the first color transmissive beam and the first color reflective beam and comprising:
a second transmissive region capable of allowing the other one of the first color transmissive beam and the first color reflective beam to pass through so as to form a first color sub-transmissive beam; and
a second reflective region capable of reflecting the other one of the first color transmissive beam and the first color reflective beam to form a first color sub-reflective beam, wherein the second transmissive region and the second reflective region alternately pass through the transmission path of the other one of the first color transmissive beam and the first color reflective beam when the second rotation wheel rotates; and
a second phosphor element, wherein one of the first color sub-transmissive beam and the first color sub-reflective beam excites the second phosphor element to form a third color beam, and a color of the third color beam is different from the color of the first color beam and different from the color of the second color beam;
wherein the light combining element combines at least the second color beam, the third color beam, and the other one of the first color sub-transmissive beam and the first color sub-reflective beam to form the illumination beam.

30. The projection apparatus according to claim 29, wherein the illumination system further comprises:
a first dichroic element allowing the one of the first color transmissive beam and the first color reflective beam to transmit from the first rotation wheel to the first phosphor element; and
a second dichroic element allowing the one of the first color sub-transmissive beam and the first color sub-reflective beam to travel to the second phosphor element, allowing the third color beam from the second phosphor element to transmit to the light combining element, wherein the first dichroic element allows the second color beam from the first phosphor element to transmit to the second dichroic element, and the second dichroic element allows the second color beam from the first dichroic element to travel to the light combining element.

31. The projection apparatus according to claim 30, wherein the illumination system further comprises a reflector reflecting the second color beam from the second dichroic element to the light combining element and reflecting the third color beam from the second dichroic element to the light combining element.

32. The projection apparatus according to claim 29, wherein the second transmissive region and the second reflective region alternately pass through the transmission path of the other one of the first color transmissive beam and the first color reflective beam in periods of the first color beam striking the first rotation wheel to form the other one of the first color transmissive beam and the first color reflective beam.

* * * * *